United States Patent Office 2,806,379
Patented Sept. 17, 1957

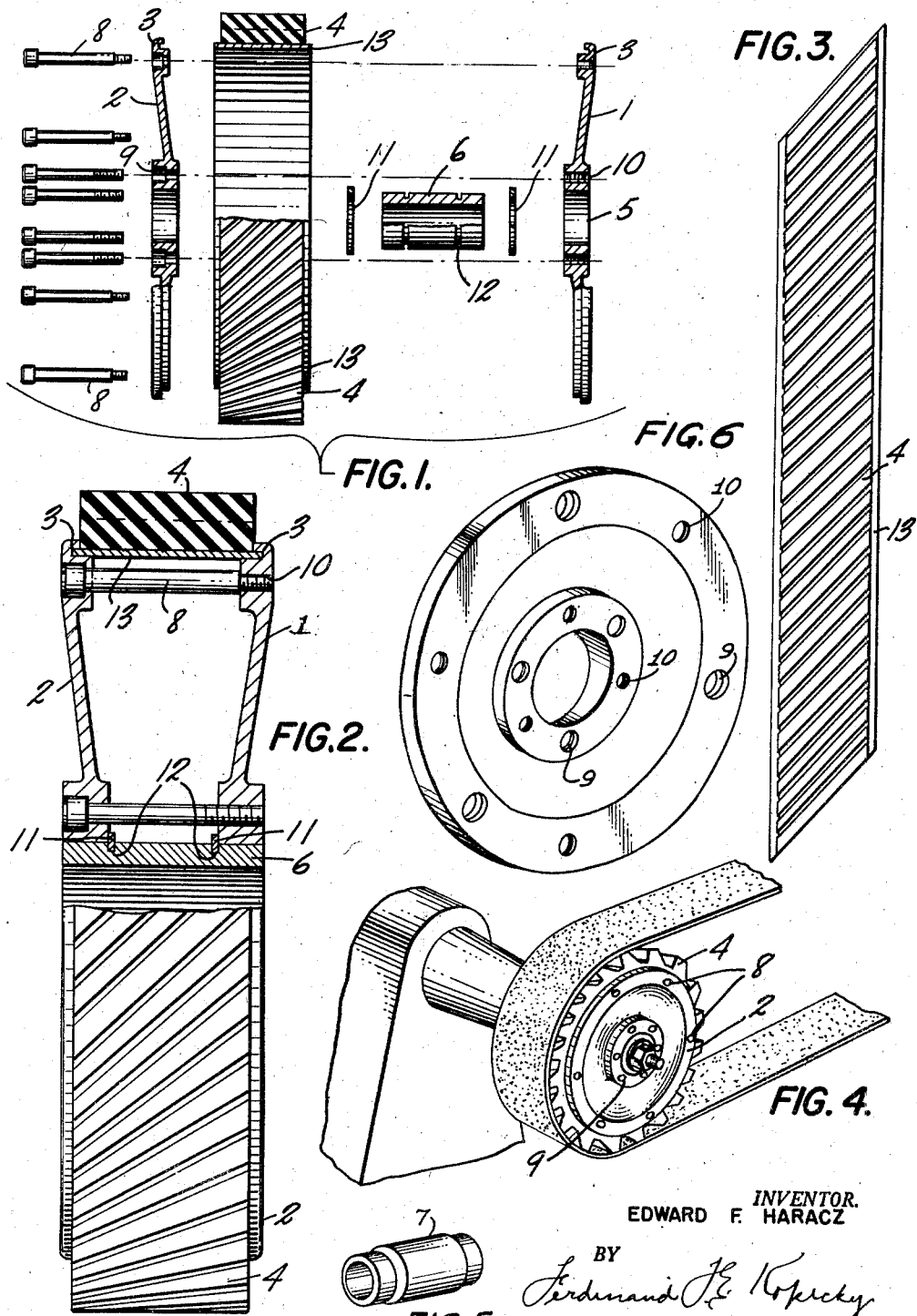

2,806,379
CONTACT WHEELS FOR BELTS
Edward F. Haracz, Clifton, N. J.

Application August 6, 1954, Serial No. 448,228

4 Claims. (Cl. 74—230.3)

The present invention relates to contact or drive wheels or pulleys which are to be used to drive or impel essentially flat belts provided with abrasive, buffing, burnishing or polishing surface coatings for purposes of grinding or polishing glass, organic plastics and similar solid substances.

The wheels or pulleys of this invention are composed of a plurality of units which are readily capable of being assembled into a rigid structure that is substantially free from tendency to vibrate, chatter, or produce dynamic unbalance. They are also of such construction that wheels having various widths and different contact surfaces can be assembled by replacement of a minimum number of the separate units. The wheels are also so constructed that a variety of bores may be easily obtained by simple replacement of a bushing so that they may be mounted on drive shafts of different diameters. Other objects and advantages of the invention, some of which are specifically referred to hereinafter, will be obvious to those skilled in the art to which the invention pertains.

A specific embodiment of the wheels of my invention is represented in the accompanying drawing, the figures of which are respectively as follows:

Figure 1 is a representation of the various units in side and partial sectional views, from which the wheels are formed.

Figure 2 is an end elevation and partial sectional view of the assembled wheel.

Figure 3 is a top view of the contact or driving surface element of the wheel, in flat or spread-out form.

Figure 4 is a view in perspective of the wheel assembly mounted on the shaft of a polishing jack with an abrasive belt in place.

Figure 5 represents an alternative type of bushing unit which is described in greater detail hereinafter.

Figure 6 represents the face of an alternative interchangeable form of end plate for the wheel of my invention.

The wheels of my invention are composed of two circular end discs or plates 1 and 2 which may be, but are not necessarily, identical and therefore interchangeable, and each of which is provided with annular grooves or slots 3 in a complete circle close to the circumferences of each of the plates for engaging the contact surface element or member or annular rim 4. Each of these end plates 1 and 2 is bored to provide a hole or opening 5 for a central bushing of the type 6 or 7 (Figure 5). These bushings are not hubs since the wheel does not rotate in the bushing but is merely mounted by means of the bushing onto a rotatable spindle or shaft of a polishing jack. Each of the plates 1 and 2 is also provided with holes through which the fastening bolts 8 pass; these are preferably countersunk or recessed as depicted in the drawing. As represented in the drawing, these fastening bolts 8 pass through the hole 9 of plate 2 and engage with the threaded hole 10 in plate 1 (Fig. 1). The shoulder of the hole 10 on plate 1 prevents the fastening bolt from drawing the two end plates so close together as to shear them.

The arrangement of unthreaded holes 9 and threaded holes 10 may be varied so that each of the plates 1 and 2 contain alternate threaded and unthreaded holes, so that one half of the end bolts 8 are inserted through plate 1 while the other half are inserted through plate 2, making each of the end plates 1 and 2 identical, and thereby interchangeable. Such an interchangeable end plate is represented in Figure 6 of the drawing. Instead of being threaded, the end plates may be fastened together through holes 9 and 10, both of which are unthreaded and are large enough to permit the passage of the threaded portion of the bolts through them. In such case, the end plates can be fastened by nuts engaging the bolts, and the end plates will thus likewise be identical and interchangeable. To present a smooth surface and to reduce to a minimum the possibility of accidents, all heads of bolts and nuts (if used) should be recessed or countersunk.

The end plates 1 and 2 are spaced and maintained apart from each other at their centers by bushing 6, and are held apart from each other by two snap rings 11 fitting into annular grooves 12. Although only two annular grooves are represented in the drawing, more than this number may be turned or otherwise provided on the bushing 6, so that different spacings to fit different widths of contact rims or surfaces 4 may be obtained. No such arrangement is possible with bushings of the alternative type 7 represented in Figure 5, on the shoulders of which end plates 1 and 2 rest. Bushings of this type should be made for each different width required. Fastening bolts 8 of different lengths are also used to obtain contact surfaces of different widths.

The peripheral part or annular rim of the contact surface member 4 consists of an elastic material such as rubber or other plastic material of suitable hardness. It expands slightly centrifugally when the wheel rotates at proper grinding speeds and contracts resiliently when rotating at lower speeds or is at rest. Such expansion is allowed for the purpose of insuring the required traction on the inside of the belt and sometimes also for the further purpose of providing resilient cushioning for the piece being ground or polished on the wheel. When the belt is to be used for contour grinding, rims of soft resilient rubber are preferred. This rim or surface member 4 is preferably serrated or striated as represented in the drawing, so that the belt is kept pliable and thereby exposes new portions of the belt or facets of the abradant on the belt in each revolution. These striations also serve to cool the belt during its use in grinding and polishing. Such striations may be produced on the rim in the original molding operation or they may be cut into the rim subsequently.

The rubber or other plastic material that forms the rim or surface contact member 4 is molded or otherwise bonded directly to a metal backing plate 13 which has exposed lips as represented, so as to permit its being gripped firmly in the grooves 3. The metal backing plate 13 is preferably sandblasted or treated in other manner so as to produce a rough surface to provide a firmer gripping of the plastic material. These rims or contact members 4 may be produced in ribbon or continuous form and be then cut to size and bent to encircle the wheel as represented in the drawing. This metal backing plate 13 is preferably spring steel or some other metal that can be bent to form a circular rim of the desired diameter and having the rigidity desired for various operations. The metal plate need not be flat but may have a corrugated or undulating surface.

The end plates 1 and 2 may be formed of aluminum castings or may be of machined bar steel or die-formed sheet steel. The wheels normally required will range in size from approximately 2 to 36 inches in diameter and their widths from approximately 1 to 24 inches.

Inasmuch as the foregoing specification comprises preferred embodiments of my invention, it is to be understood that these were selected merely for purposes of illustration and that modifications may be made therein without departing from the invention or its scope as defined in the appended claims.

I claim:

1. A contact wheel for driving an essentially flat belt which comprises (a) two circular end plates forming the sides of the wheel, each having a recessed annular groove close to its circumference and each having a central circular hole, (b) a unitary metal bushing fitting within each of the central holes of the two end plates, provided with a bore for mounting the wheel on a rotatable spindle, and provided with means for securing the end plates apart from each other at the hub, (c) a circular rigid rim whose edges are secured between the recessed annular grooves of the two end plates and which has bonded to it a plastic rim contact surface element of such width as to clear the end plates, and (d) a plurality of holes in the end plates about the central bushing and about the annular grooves, and bolts fitting within the holes, to secure the circular rim, the bushing, and the end plates together.

2. A contact wheel as defined in claim 1 in which the holes about the central bushing and annular groove of each of the end plates are provided at their outermost extremities with recesses to enclose the heads of the securing bolts within the said end plates.

3. A contact wheel as defined in claim 1 in which the two circular end plates are identical.

4. A contact wheel as defined in claim 1 in which the two end plates are held apart at their center by snap rings on the central bushing.

References Cited in the file of this patent

UNITED STATES PATENTS

| | | |
|---|---|---|
| 314,470 | Pierce | Mar. 24, 1885 |
| 1,422,389 | Swain | July 11, 1922 |
| 1,555,949 | Exton | Oct. 6, 1925 |
| 1,631,349 | Thornton | June 7, 1927 |
| 1,814,623 | Finnell | July 14, 1931 |
| 2,652,285 | Negri | Sept. 15, 1953 |
| 2,725,691 | Sommer | Dec. 6, 1955 |

FOREIGN PATENTS

| | | |
|---|---|---|
| 1,049,598 | France | Aug. 19, 1953 |